United States Patent [19]

Daniel et al.

[11] Patent Number: 4,931,986
[45] Date of Patent: Jun. 5, 1990

[54] COMPUTER SYSTEM CLOCK GENERATOR FOR GENERATING TUNED MULTIPLE CLOCK SIGNALS

[75] Inventors: Richard A. Daniel; Stuart C. Rowson, both of Escondido, Calif.; James E. Barnhart, St. Peters, Mo.; Woonsuk Paek, Fremont, Calif.

[73] Assignee: NCR Corporation, Dayton, Ohio

[21] Appl. No.: 318,400

[22] Filed: Mar. 3, 1989

[51] Int. Cl.⁵ .................. G06F 1/04; G06F 1/12; H03K 5/106; H04L 7/033
[52] U.S. Cl. .................. 364/900; 364/934; 364/934.1; 364/950.3; 364/950.4; 364/950.5; 364/926.5; 364/959; 370/100.1; 370/108; 375/118; 328/55; 328/61; 328/62; 328/72; 377/54; 377/72; 377/76; 377/78
[58] Field of Search .............. 370/100, 108; 375/116, 375/118; 364/569, 200 ms file, 900 ms file; 328/55, 56, 60, 61, 62, 63, 72; 377/54, 72, 76, 78, 80; 307/269

[56] References Cited

U.S. PATENT DOCUMENTS

| 3,577,086 | 5/1971 | Kliman et al. | 328/62 |
| 3,596,187 | 7/1971 | Thompson | 328/63 |
| 3,673,501 | 6/1972 | Zeph | 328/37 |
| 3,743,948 | 7/1973 | Dahlin et al. | 328/119 |
| 3,824,480 | 7/1974 | Eshraghian | 328/75 |
| 4,034,301 | 7/1977 | Kashio | 328/37 |
| 4,063,308 | 12/1977 | Collins et al. | 364/200 |
| 4,087,627 | 5/1978 | Sato et al. | 178/69.1 |
| 4,134,073 | 1/1979 | MacGregor | 328/63 |
| 4,165,490 | 8/1979 | Howe, Jr. et al. | 328/60 |
| 4,229,825 | 10/1980 | Guidoux | 375/118 |
| 4,241,418 | 12/1980 | Stanley | 364/900 |
| 4,257,108 | 3/1981 | Igel | 364/900 |
| 4,331,925 | 5/1982 | Rittenbach | 328/42 |
| 4,334,194 | 6/1982 | Rittenbach | 328/42 |
| 4,359,770 | 11/1982 | Suzuka | 370/108 |
| 4,371,962 | 2/1983 | Zeitraeg | 370/100 |
| 4,402,080 | 8/1983 | Mueller | 370/100 |
| 4,414,637 | 11/1983 | Stanley | 364/569 |
| 4,443,765 | 4/1984 | Findeisen et al. | 328/55 |
| 4,546,269 | 10/1985 | Johnson | 364/900 X |
| 4,677,648 | 6/1987 | Zurfluh | 328/56 |
| 4,755,704 | 7/1988 | Flora et al. | 328/55 X |
| 4,868,514 | 9/1989 | Azevedo et al. | 328/55 |

OTHER PUBLICATIONS

Kaupp, "Shift Pulse Generator", RCA TV No. 591, Dec. 1964.
Harvey, "Delay Line in Shift Register Speeds M. Sequence Generation", Electronics, Nov. 27, 1975, pp. 104-105.
Maude, "Pseudo-Random Byte Generator", Electronic Product Design, Jun. 1981, pp. 29-30.

Primary Examiner—Archie E. Williams, Jr.
Assistant Examiner—Emily Y. Chan
Attorney, Agent, or Firm—Hawk, Jr. Wilbert; Stephen F. Jewett; Gregory P. Gadson

[57] ABSTRACT

A computer system clock generator generates several system clock signals which are in a tuned state at desired locations, thereby offsetting the effects of varying propagation delays among the system clock signals. A shift register ring has one of its taps selectively connected to its data input so that a series of logic high level and logic low level data is advanced through the shifting stages. A tap selector for each desired output signal logically combines the signals output from the appropriate taps to produce output clock signals having desired leading and trailing edges.

7 Claims, 2 Drawing Sheets

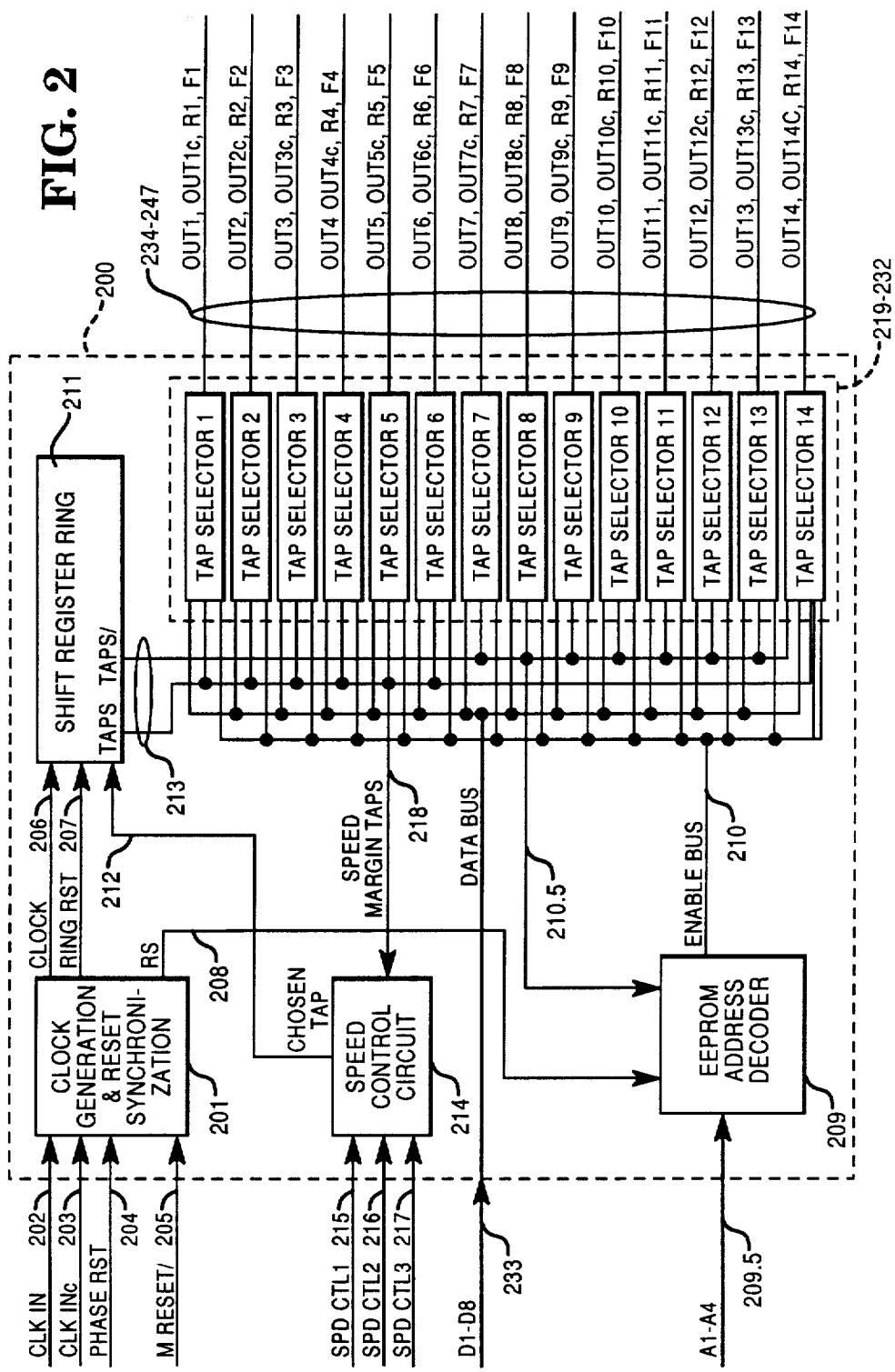

COMPUTER SYSTEM CLOCK GENERATOR FOR GENERATING TUNED MULTIPLE CLOCK SIGNALS

BACKGROUND OF THE INVENTION

The present invention generally relates to computer system clocks, and more particularly to a method and apparatus for generating multiple clock signals which are in tune (in a tuned state) at desired locations.

Modern digital electronic computers perform a number of routine operations which are controlled by separate clock signals. However, the clock signals must be synchronized (though not necessarily completely matched in all computer systems) at predetermined locations in order for proper functioning of the computer. When simultaneously generated, these separate clock signals do not often arrive at a chosen destination in the same manner, due to variations in propagation path impedance, and other things which may affect the propagation delay of the individual clock signals.

SUMMARY OF THE INVENTION

It is an object of the present invention to provide a new and improved device for generating computer system clock signals, which after propagating through separate paths, are in tune (all clock signals have simultaneously occurring rising edges and falling edges, respectively) at desired locations.

It is another object of the present invention to provide such a device with a means for generating clock signals with varying leading and trailing edges based upon the manipulation of one input clock signal.

It is yet another object of the present invention to meet the above objects by combining the necessary circuitry on a single integrated circuit chip.

It is still a further object of the present invention to provide software control for the above objects.

There is provided in accordance with the present invention a computer system clock generator for generating a plurality of system clock signals. The device contains, inter alia, an input clock for producing an input clock signal, a shift register ring having a plurality of shifting stages connected at a first input to the input clock and connected at a second input to a complemented version of one of its output signals, the input clock signal controlling the shifting of the shifting stages, and at least one tap selector connected to a plurality of the shifting stages for selectively combining signals output from the shift register ring stages to produce an output clock signal of desired characteristics.

The preferred embodiment of the present invention has a shift register ring with several shifting stages, each stage being referred to as a "tap". The shifting action is controlled by an input clock signal. A tap is selected to be complemented and fed back to the data input of the shift register ring, so that a string of data representative of one binary logic level is shifted through the shift register, followed by a string of data representative of the other binary logic level.

A separate tap selector for each desired output clock signal is coupled to the taps for selectively and logically combining the tap signals to obtain output signals with the desired leading and trailing edges. The tap selectors are capable of further (fine) phase adjustment by selectively introducing a small amount of delay where needed. A separate tap selector register for each tap selector is loaded with the data needed to control its operation. The data for the tap selector registers is ultimately stored in a non-volatile memory (such as an electrically erasable, programmable memory, or EEPROM, in the preferred embodiment) so that re-tuning is unnecessary after power is removed from the system.

The present invention also contains a frequency controller connected to several of the taps which are nearest the shift register ring end indicated by the direction of propagation. By selecting the tap to be complemented and coupled to the data input of the shift register ring, the frequency of the output signals can be controlled.

The details of the present invention will be revealed in the following description with reference to the attached drawings.

BRIEF DESCRIPTION OF THE DRAWINGS

FIG. 2 is a schematic block diagram of an Application Specific Integrated Circuit (ASIC) chip containing the present invention.

DESCRIPTION OF THE PREFERRED EMBODIMENT

Figure 1:
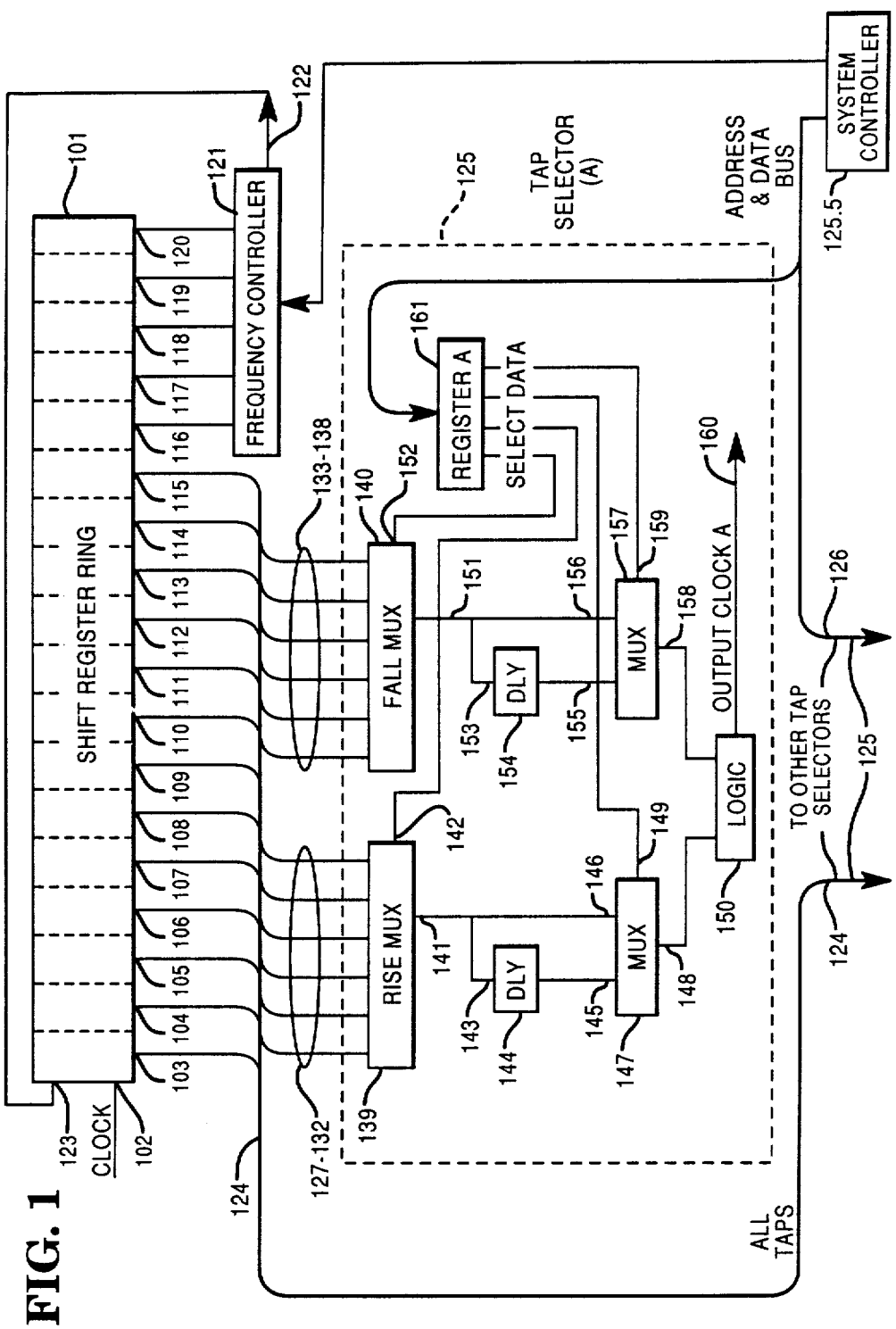
FIG. 1 is a schematic block diagram of the shift register ring, the frequency controller and one of the tap selectors of the present invention.

Referring now to FIG. 1, a shift register ring 101 receives an input clock signal CLOCK at the clock input 102. Data in the shift register ring moves from left to right in the figure, and then back to an input, as will be explained infra.

Each of the shifting stages (taps) 103-120 represents a one bit binary number corresponding to a logic high or low value, which was the value of the preceding tap during the previous clock period. The delay between each tap is equal to the period of the input clock signal. Shifting occurs on each rising edge of the input clock signal.

A frequency controller (or multiplexer with its output inverted) 121 has as its inputs, taps 116-120, and an output 122. The output 122 is coupled to the data input 123 of the shift register ring 101. The frequency controller 121, depending on the desired frequency of the independent clock signals produced, selects one of the taps 116-120, with the highest possible frequency being produced when tap 116 is selected, and the lowest possible frequency resulting when tap 120 is selected. In the preferred embodiment, the frequency controller 121 also complements or inverts the input signal selected before passing it on via output 122 to input 123. Also, the shift register ring 101 is initialized so that, before the shifting of bits through the register, all taps are at a logic high level.

The effect of the above arrangement, particularly because of inversion of the selected tap by the frequency controller 121, is that every tap experiences a logic high level for a number of shifting stages equal to the number of taps prior to the tap chosen by the frequency controller 121, then the same number of shifting stages at a logic low level, then again the same number of shifting stages at a logic high level, and so forth. By selecting the appropriate combination of taps, a clock output signal is produced by the tap selector which may be varied, for example, in pulse width and phase angle. The operation of the frequency controller 121 is controlled by a system controller 125.5.

A tap bus 124 connects all of the taps 103-120 and tap selectors 125, in order to transfer data from each tap of the shift register ring 101 as required. Only one of the tap selectors 125 is illustrated in FIG. 1 for ease of description. All of the tap selectors function identically, but may be separately programmed and operated to produce independent desired output clock signals.

Empirical evidence has shown that it is not necessary for every tap to be available to establish both the rising and falling edges of the ultimate output clock signals. Consequently, a group of tap connector lines 127-132, wired to the tap selector bus 124, are sufficient to establish a rising edge. Similarly, the tap connector lines 133-138 are sufficient to establish falling edges.

The tap connector lines 127-132 form the data inputs to a six-to-one rise multiplexer 139, which selects one the taps to output at output 141. The rise multiplexer 139 also contains a control input 142 for controlling the tap selection. The output 141 branches into two paths 143 and 146. Path 143 connects a delay element 144 for delaying the signal from the selected tap by one-half the period of the input clock signal CLOCK. This signal is output at 145 and forms a first input to a two-to-one multiplexer 147. Undelayed path 146 forms the second input to the multiplexer 147. The multiplexer 147 also has connected thereto an output 148 and a control input 149. The output 148 is also the first input to a logic gate 150.

The falling edges are selected with circuitry identical to that for the rising edges, with elements 133-138, 140 and 151-159 corresponding to elements 127-132, 139 and 141-149, respectively. The output clock signal OUTPUT CLOCK A is developed at tap selector output 160 by combining inputs 148 and 158 in the logic gate 150 (an AND gate in the preferred embodiment). The control lines 142, 149, 152 and 159 all receive data bits from a control register 161. The register 161 is addressed by the system controller 125.5 via an address and data bus 126. The bus 126 also sends a data word to the register 161 from the system controller 125.5. The data in register 161 ultimately determines the nature of OUTPUT CLOCK A.

The other tap selectors operate identically to the tap selector 125, and each may produce an independent, output clock signal in such a way that all output clock signals, after propagation along separate propagation paths, are in tune at specified locations.

FIG. 2 shows an ASIC chip 200 which includes elements that perform the functions of the circuit in FIG. 1 and others, for the generation of tuned clock signals. The clock generation and reset synchronization block 201 generates the various clock signals for a shift register ring 211. It has as its inputs 202 and 203, a clock input signal CLK IN and its complement CLK INc, respectively, used to drive the chip circuitry, a phase reset signal PHASE RST introduced at input 204 for determining the phase of the clock signals upon power-up for simulation purposes, and a complemented reset signal M RESET/ introduced at input 205 for resetting the chip. The outputs of the clock generation and reset synchronization block 201 are the clock input signal CLOCK for the shift register ring 211 on path 206, a ring reset signal RING RST on path 207 for resetting the shift register ring 211, and a reset signal RS on path 208 for resetting an EEPROM address decoder 209.

The primary functions of the EEPROM address decoder 209 are to decode EEPROM addresses A1-A4 transmitted on an address bus 209.5 and to generate enable signals for the appropriate tap selectors via an enable bus 210. The enable signals permit loading of the aforementioned tap selector control words into their control registers. The EEPROM address decoder 209 also receives at one of its inputs 210.5, complemented outputs of the taps from the shift register ring 211.

A group of buses 213 connect the taps of the shift register ring 211 and their complements to the tap selectors 219-232 (labeled TAP SELECTOR 1 through TAP SELECTOR 14). In the preferred embodiment tap selectors 1-6 are connected to the taps, while tap selectors 7-14 are connected to complemented versions of the taps. The outputs of the taps are sent via a bus 218 to a speed control circuit 214, which outputs the signal from a chosen tap at output 212, the effect being to control the frequency of the shift register ring 211. The speed control circuit 214 includes the operations of the frequency controller 121 in FIG. 1, and is controlled by speed control signals SPD CTL1, SPD CTL2 and SPD CTL3 at inputs 215-217.

In addition to being connected to the tap selector buses 213 for receiving data from the taps, the tap selectors 219-232 are also connected to the data bus 233 for receiving tap selector control data D1-D8. The tap selectors are enabled by the EEPROM address decoder 209 via enable bus 210. The data D1-D8 transmitted on the data bus 233 originates initially from a monitor computer (not shown) for monitoring the tuning process, and then later from an EEPROM (also not shown) which stores the tap selector control words corresponding to the tuned condition. Each tap selector outputs four signals representing an independent output clock signal OUT1-OUT14, its complement OUT1c-OUT14c, a delayed signal R1-R14 (by one nanosecond in the preferred embodiment) from the rising edge tap, and a delayed signal F1-F14 (also by one nanosecond in the preferred embodiment) from the falling edge tap, via output lines 234-247.

In accordance with the present invention, each of the clock signals emanating from outputs 234-247, although having different propagation paths, are then in a tuned state at their chosen tuning locations.

The following elements in FIG. 1 have analogous elements shown in FIG. 2 indicated by parentheses: shift register ring 101 (shift register ring 211); CLOCK at input 102 (CLOCK on path 206); frequency controller 121 (speed control circuit 214); frequency controller output 122 and shift register ring data input 123 (path 212); tap selector bus 124 (tap selector buses 213); tap selectors 125 (tap selectors 1-14); address and data bus 126 (address bus 209.5 and data bus 233); and OUTPUT CLOCK A (OUT1-OUT14).

Variations and modifications to the present invention are possible given the above disclosure. However, all such variations and modifications are intended to be within the scope of the invention claimed by this letters patent.

For example, the number of tap selectors—and hence independent output clock signals—may be different from the number output by the preferred embodiment. Also, the frequency controller 121 may be connected to a greater or lesser number of the taps than shown for the preferred embodiment.

We claim:

1. In a computer system, a computer system clock generator for generating a plurality of system clock signals comprising:

an input clock for producing an input clock signal;

a shift register ring having multiple shifting stages coupled at a first of at least two inputs to said input clock, said input clock signal controlling the shifting of said shifting stages;

coupling means for coupling a second input of said shift register ring to a complemented version of one of a plurality of said shift register stages' output signals; and at least two tap selectors, each coupled to a plurality of said shifting stages for selectively combining signals output from said shift register ring stages to produce an output clock signal of desired characteristics, which output signals of said tap selectors vary when leaving said tap selectors in such a manner that they arrive in tune at predetermined locations in said computer system after having propagated along separate propagation paths; wherein said coupling means comprises a frequency controller coupled at its inputs to at least two of said shift register ring stages, said controller controlling the frequency of said output clock signals produced by selecting the shift register ring stage signal to be complemented and coupled to said second input.

2. In a computer system, a computer system clock generator for generating a plurality of system clock signals comprising:

an input clock for producing an input clock signal;

a shift register ring having multiple shifting stages coupled at a first of at least two inputs to said input clock, said input clock signal controlling the shifting of said shifting stages;

coupling means for coupling a second input of said shift register ring to a complemented version of one of a plurality of said shift register stages' output signals; and at least two tap selectors, each coupled to a plurality of said shifting stages for selectively combining signals output from said shift register ring stages to produce an output clock signal of desired characteristics, including phase angle, which output signals of said tap selectors vary when leaving said tap selectors in such a manner that they arrive in tune at predetermined locations in said computer system after having propagated along separate propagation paths; wherein said coupling means comprises a frequency controller coupled at its inputs to at least two of said shift register ring stages, said controller controlling the frequency of said output clock signals produced by selecting the shift register ring stage signal to be complemented and coupled to said second input.

3. In a computer system, a computer system clock generator for generating a plurality of system clock signals comprising:

an input clock for producing an input clock signal;

a shift register ring having multiple shifting stages coupled at a first of at least two inputs to said input clock, said input clock signal controlling the shifting of said shifting stages;

coupling means for coupling a second input of said shift register ring to a complemented version of one of a plurality of said shift register stages' output signals; and at least two tap selectors, each coupled to a plurality of said shifting stages for selectively combining signals output from said shift register ring stages to produce an output clock signal of desired characteristics, including pulse width, which output signals of said tap selectors vary when leaving said tap selectors in such a manner that they arrive in tune at predetermined locations in said computer system after having propagated along separate propagation paths; wherein said coupling means comprises a frequency controller coupled at its inputs to at least two of said shift register ring stages, said controller controlling the frequency of said output clock signals produced by selecting the shift register ring stage signal to be complemented and coupled to said second input.

4. In a computer system, a computer system clock generator for generating a plurality of system clock signals comprising:

an input clock for producing an input clock signal;

a shift register ring having multiple shifting stages coupled at a first of at least two inputs to said input clock, said input clock signal controlling the shifting of said shifting stages;

coupling means for coupling a second input of said shift register ring to a complemented version of one of a plurality of said shift register stages' output signals; and at least two tap selectors, each coupled to a plurality of said shifting stages for selectively combining signals output from said shift register ring stages defining rising edges and falling edges, to produce an output clock signal of desired characteristics, which output signals of said tap selectors vary when leaving said tap selectors in such a manner that they arrive in tune at predetermined locations in said computer system after having propagated along separate propagation paths;

wherein each said tap selector comprises a rising edge multiplexer means for selecting a rising edge and a falling edge multiplexer means for selecting a falling edge, and each said tap selector further comprises combining means coupled to said rising edge and falling edge multiplexer means for combining the outputs from said rising edge and falling edge multiplexer means to form said output clock signals.

5. The computer system clock generator in claim 4 further comprising control means for controlling in each tap selector, the operation of said rising and falling edge multiplexer means and said combining means.

6. The computer system clock generator in claim 5 wherein each said tap selector comprises separate delay means coupled between said rising edge multiplexer means and said combining means, and coupled between said falling edge multiplexer means and said combining means, for selectively delaying signals from said rising edge and falling edge multiplexer means under the control of said control means.

7. The computer system clock generator in claim 6 wherein said control means comprises in each tap selector, a control register coupled to said rising edge and falling edge multiplexer means, said combining means and said means for selectively delaying, for storing a control word, said control word directing the operation of of said rising edge and falling edge multiplexer means, said combining means and said means for selectively delaying.

* * * * *